(12) United States Patent
Meng et al.

(10) Patent No.: US 9,503,248 B2
(45) Date of Patent: Nov. 22, 2016

(54) USER EQUIPMENT AND BASE STATION USING DYNAMIC TDD CONFIGURATION MECHANISM

(71) Applicant: HTC Corporation, Taoyuan County (TW)

(72) Inventors: Ling-San Meng, Taoyuan County (TW); Chih-Yao Wu, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 111 days.

(21) Appl. No.: 14/267,908

(22) Filed: May 1, 2014

(65) Prior Publication Data

US 2014/0293846 A1 Oct. 2, 2014

Related U.S. Application Data

(63) Continuation-in-part of application No. 14/228,267, filed on Mar. 28, 2014.

(60) Provisional application No. 61/818,924, filed on May 3, 2013, provisional application No. 61/832,159, filed on Jun. 7, 2013, provisional application No. 61/806,380, filed on Mar. 28, 2013.

(51) Int. Cl.
*H04L 5/14* (2006.01)
*H04L 1/18* (2006.01)
*H04W 72/12* (2009.01)

(52) U.S. Cl.
CPC ............ *H04L 5/1438* (2013.01); *H04L 1/1887* (2013.01); *H04W 72/1289* (2013.01)

(58) Field of Classification Search
None
See application file for complete search history.

(56) References Cited

U.S. PATENT DOCUMENTS

| 2013/0194980 A1* | 8/2013 | Yin ...................... H04L 1/1854 370/280 |
| 2014/0086112 A1 | 3/2014 | Stern-Berkowitz et al. |
| 2014/0122957 A1 | 5/2014 | Charbit et al. |

OTHER PUBLICATIONS

HTC: "Interference Issues for Supporting Backward Compatibility in TDD eIMTA Systems", 3rd Generation Partnership Project (3GPP), Mobile Competence Centre; 650, Route Des Lucioles; vol. RAN WG1, no. Chicago, USA; 20130415-20130419, Apr. 6, 2013, XP050697116, p. 1-p. 4.
HTC: "On HARQ Timing Issues for TDD UL-DL Reconfiguration", 3rd Generation Partnership Project (3GPP), Mobile Competence Centre; 650, Route Des Lucioles; vol. RAN WG1, no. Malta; 20130118-20130201, Jan. 18, 2013, XP050663407, p. 1-p. 6.
(Continued)

*Primary Examiner* — Huy D Vu
*Assistant Examiner* — Bao G Nguyen
(74) *Attorney, Agent, or Firm* — Jianq Chyun IP Office

(57) ABSTRACT

The present disclosure is directed to a user equipment and a base station which use a dynamic time division duplex (TDD) configuration mechanism. The present disclosure proposes implementing the dynamic TDD mechanism by imposing a restriction to the dynamic TDD configurations to adhere to a set of allowable dynamic TDD configurations. The uplink and downlink HARQ timing reference configurations could be derived from the set of allowable dynamic TDD configurations. The set of allowable TDD configurations, the uplink HARQ timing reference configuration and the downlink HARQ timing reference configuration could be derived based on specific rules. The maximum number of downlink HARQ processes for TDD would follow the downlink HARQ timing reference configuration.

18 Claims, 10 Drawing Sheets

(56) References Cited

OTHER PUBLICATIONS

Renesas Mobile Eurpoe LTD: "Discussion on Enhancements for Dynamic TDD UL-DL Configuration", 3rd Generation Partnership Project (3GPP), Mobile Competence Centre; 650, Route Des Lucioles; vol. RAN WG1, no. Prague, Czech Republic, 20120521-20120525, May 12, 2012, XP050600626, p. 1-p. 4.

"Search Report of European Counterpart Application", issued on Aug. 20, 2014, p. 1-p. 4, in which the listed references were cited.

"Office Action of European Counterpart Application", issued on Sep. 5, 2014, p. 1-p. 6, in which the listed references were cited.

"3rd Generation Partnership Project; Technical Specification Group Radio Access Network; Evolved Universal Terrestrial Radio Access (E-UTRA); Further enhancements to LTE Time Division Duplex (TDD) for Downlink-Uplink (DL-UL) interference management and traffic adaptation," 3GPP TR 36.828 V11.0.0, Jun. 2012.

"LTE; Evolved Universal Terrestrial Radio Access (E-UTRA); Physical channels and modulation," ETSI TS 136 211 V11.0.0, Oct. 2012.

"LTE; Evolved Universal Terrestrial Radio Access (E-UTRA); Physical layer procedures," ETSI TS 136 213 V11.0.0, Oct. 2012.

"3rd Generation Partnership Project; Technical Specification Group Radio Access Network; Evolved Universal Terrestrial Radio Access (E-UTRA); Medium Access Control (MAC) protocol specification," 3GPP TS 36.321 V11.0.0, Sep. 2012.

"3rd Generation Partnership Project; Technical Specification Group Radio Access Network; Evolved Universal Terrestrial Radio Access (E-UTRA); Multiplexing and channel coding," 3GPP TS 36.212 V11.0.0, Sep. 2012.

Office Action of U.S. Appl. No. 14/228,267, issued on Jun. 13, 2016, p. 1-p. 18, in which the listed reference was cited.

* cited by examiner

| Uplink-Downlink Configuration | Subframe Number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

FIG. 1A

| TDD UL/DL Configuration | Maximum number of HARQ processes |
|---|---|
| 0 | 4 |
| 1 | 7 |
| 2 | 10 |
| 3 | 9 |
| 4 | 12 |
| 5 | 15 |
| 6 | 6 |

FIG. 1B

| TDD Configuration | Set of allowed dynamic TDD configurations, $B_i$ |
|---|---|
| 0 | 0 |
| 1 | 1,2,4,5 |
| 2 | 2,5 |
| 3 | 3,4,5 |
| 4 | 4,5 |
| 5 | 5 |
| 6 | 6 |

FIG. 4

| TDD Configuration, i | Set of allowed dynamic TDD configurations, Bi | UL HARQ reference configurations, Ui | DL HARQ reference configurations, Di | DL HARQ Buffer setting $M_{DL\_HARQ}$ |
|---|---|---|---|---|
| 0 | 0 | 0 | 0 | 4 |
| 1 | 1,2,4,5 | 1 | 5 | 15 |
| 2 | 2,5 | 2 | 5 | 15 |
| 3 | 3,4,5 | 3 | 5 | 15 |
| 4 | 4,5 | 4 | 5 | 15 |
| 5 | 5 | 5 | 5 | 15 |
| 6 | 6 | 6 | 6 | 6 |

FIG. 6

USER EQUIPMENT AND BASE STATION USING DYNAMIC TDD CONFIGURATION MECHANISM

CROSS-REFERENCE TO RELATED APPLICATION

This application is a continuation-in-part application of and claims the priority benefit of a prior application Ser. No. 14/228,267, filed on Mar. 28, 2014, now pending. The prior application Ser. No. 14/228,267 claims the priority benefit of U.S. provisional application Ser. No. 61/806,380, filed on Mar. 28, 2013. The continuation-in-part application also claims the priority benefit of U.S. provisional application Ser. No. 61/818,924, filed on May 3, 2013 and U.S. provisional application Ser. No. 61/832,159, filed on Jun. 7, 2013. The entirety of each of the above-mentioned patent applications is hereby incorporated by reference herein and made a part of this specification.

TECHNICAL FIELD

The present disclosure directs to a user equipment and a base station which use a dynamic time division duplex (TDD) configuration mechanism.

BACKGROUND

The topic of "Further Enhancements to LTE Time Division Duplex (TDD) for Downlink-Uplink (DL-UL) Interference Management and Traffic Adaptation" has been agreed as a study item in 3GPP release 11 and a work item in 3GPP release 12. Performance evaluation of various deployment scenarios has been conducted by both 3GPP RAN 1 and RAN 4 working groups. It has been shown that an average cell throughput can be improved to a large extend by allowing dynamic reconfigurations in Long Term Evolution (LTE) time division duplex (TDD) systems.

The TDD scheme would offer flexible deployments without requiring a multiple spectrum resources. Currently, the LTE TDD would allow for asymmetric downlink-uplink (DL-UL) allocations by providing seven different semi-statically configured DL-UL configurations as illustrated in FIG. 1A, and these allocations can provide between 40% and 90% DL subframes. To be more specific, the seven different semi-statically configured DL-UL configurations are indexed in the left most column of FIG. 1A and are numbered between 0~6. In the present disclosure, a DL-UL configuration is also referred to as a TDD configuration or a TDD DL-UL configuration. For each TDD configuration, subframes of a radio frame would be configured as a downlink subframe, as an uplink subframe, or as a special subframe, and the top row of FIG. 1A shows the index of the subframe numbers. Therefore, in order to configure a radio frame to have a certain number of downlink and uplink slots, an evolved Node B (eNB) would transmit one of the UL-DL configurations in system information (SI).

For example, if heavy downlink traffic has been experienced by the network, the eNB could decide upon the TDD configuration 5 which would be transmitted to UEs and would provide 8 downlink slots and 1 uplink slot per radio frame. However, if heavy downlink traffic has all in a sudden been changed to heavy uplink traffic, the eNB may not change the TDD configuration instantly but has to convey the change by modifying the system information, and the modification of the system information for a legacy UE could only occur at a modification boundary. This would mean that the re-configuration of the TDD configuration via the SI change would be semi-static rather than dynamic and may not match the instantaneous traffic situation.

In comparison to the system information change procedure, known dynamic re-configuration techniques would require a much shorter period for TDD reconfiguration. Evaluation in the corresponding study item reveal significant performance benefits by allowing TDD DL-UL reconfiguration based on traffic adaptation in small cells as mentioned in "Further enhancements to LTE Time Division Duplex (TDD) for Downlink-Uplink (DL-UL) interference management and traffic adaptation," 3GPP TR 38.828, V11.0.0, 2012-06, which is incorporated by reference for definition purposes. Also, it was shown that a dynamic signaling mechanism would outperform the mechanism that uses the system information change procedure.

Also for definition purposes, the TDD frame structure, DL-UL configurations, and the UL-HARQ timing relations would be defined according to "Physical Channels and Modulation," 3GPP TS 36.211, V11.0.0, 2012-09, "Physical Layer Procedures," 3GPP TS.213, V11.0.0, 2012-09, and "Medium Access Control (MAC) protocol specification," 3GPP TS 36.321, which are both incorporated by reference for definition purposes.

However, using dynamic techniques to re-configure a TDD configuration would cause legacy UEs without a dynamic re-configuration capability and new UEs possessing such capability to have different understandings of the TDD DL-UL configuration, since legacy UEs must follow the system information change procedure while new UE would be able to re-configure the TDD DL-UL configuration via dynamic signaling mechanisms such as physical layer signaling, medium access control (MAC) signaling, or radio resource control (RRC) signaling. This could potentially lead to a variety of problems including problems caused by UE measurements as well as Hybrid Automatic Repeat Request (HARQ) operations.

HARQ is referred to as a transmission technique widely used in modern wireless communication systems. HARQ operates by re-transmitting an identical copy of the original transmission or another redundancy version upon transmission error. The receiver then combines the previously corrupted transmissions with the retransmitted one. In LTE TDD systems, the timing relation between the feedback information indicating a transmission error and corresponding retransmission are separately and differently defined for each of the 7 configurations due to the different allocation of the DL-UL subframes. However, sudden changes of TDD configuration could cause interferences of the HARQ operation between legacy UEs and new UEs having the dynamic re-configuration capability.

Also, dynamic re-configurations of the TDD configuration would not only cause problems between legacy UEs and new UEs having the dynamic re-configuration capability but also might cause interference among new UEs since new UEs may have different HARQ reference timings for both uplinks and downlinks depending on the TDD configuration which is dynamically selected. Furthermore, dynamic re-configurations of the TDD configuration would also cause problems in the soft buffer management process of new UEs.

More specifically, using dynamic techniques to re-configure the TDD configuration would affect the soft buffer management of a UE when the UE undergoes a HARQ process. The software buffer management during a DL HARQ process could be briefly described as that for each subframe in which a downlink transmission takes place between a UE and a base station, the UE would receive payloads into transport blocks and associated DL HARQ information from the base station. The UE would then either store the payload in the buffer or combines with the payload previously stored in the buffer according to the Log-Likelihood radio (LLR) information based on whether the downlink transmission is a new transmission or an old transmission. The UE would then respond with an ACK or NACK based on decoding result of the received payload stored in the buffer. For detailed discussion related to the soft buffer setting, please refer to the citations provided above. Also the UL HARQ would function in a similar manner.

However, dynamic alterations of the TDD configuration would potentially lead to instability of the soft buffer caused by sudden changes of the TDD configuration. FIG. 1B illustrates a maximum number of DL-HARQ processes ($M_{DL-HARQ}$) for TDD in a typical LTE communication system. For the case of a frequency division duplex (FDD) system, the maximum of downlink HARQ processes is currently defined to be 8 per serving cell. For the case of a TDD system, it could be observed that the maximum number of HARQ processes per cell is not constant but would vary according to the current TDD UL/DL configuration set in the SI of a serving base station. For the case of downlink, the maximum number of DL-HARQ processes would affect how the soft buffer setting is configured by the UE. This would mean that when the TDD configuration is being dynamically altered, the soft buffer setting would also need to be dynamically re-configured. Thus, sudden alterations of a soft buffer setting before a UE would have time to react would result in losses of data previously stored in the soft buffer.

In addition, an important part of the support for downlink channel-dependent scheduling is channel-state report. The channel-state report is provided by the UE to the eNB, and eNB could make scheduling decisions based on the channel-state report. One type of the channel-state report is aperiodic channel-state report. Aperiodic channel-state reports are delivered when explicitly requested by the network by means of the channel-state-request flag included in uplink scheduling grants. Using dynamic techniques to re-configure the TDD configuration would cause timing mismatch in aperiodic channel-state reports.

As legacy UEs (before release 12) are not compatible with the technique of dynamic TDD DL-UL reconfiguration according to the challenges mentioned above, a new design could be required in order to avoid possible conflicts between legacy UEs and new UEs (release 12 and beyond). Also the new design would need to address possible conflicts among new UEs due to HARQ timing mismatches and problems related to soft buffer management.

SUMMARY OF THE DISCLOSURE

Accordingly, the present disclosure is directed to a user equipment and a base station which use a dynamic time division duplex (TDD) configuration mechanism.

According to an exemplary embodiment, the present disclosure proposes a base station which includes at least but not limited to a transmitter which transmits data, a receiver which receives data, and a processor which is coupled to the transmitter and the receiver. The processor would be configured for selecting a current time division duplex (TDD) configuration from a predetermined TDD configurations set, selecting a dynamic TDD configuration based on the current TDD configuration after transmitting the current TDD configuration via the transmitter, determining a downlink hybrid automatic request (DL-HARQ) timing reference configuration from the predetermined TDD configuration set, wherein downlink subframes of the DL-HARQ timing reference configuration are a superset of each TDD configuration of an allowable set of dynamic TDD configurations, wherein the allowable set of dynamic TDD configurations comprises one or more possible TDD configurations by which each downlink subframe of the current TDD configuration is not re-configured to a uplink subframe by the dynamic TDD configuration selected from the allowable set, and implementing a HARQ process by following a reference timing of the DL-HARQ timing reference configuration.

According to one of the exemplary embodiments, the present disclosure proposes a use equipment (UE) which includes at least but not limited to a transmitter which transmits data, a receiver which receives data, and a processor which is coupled to the transmitter and the receiver. The processor would be configured for receiving a current time division duplex (TDD) configuration from a predetermined TDD configurations set, receiving a dynamic TDD configuration based on the current TDD configuration after receiving the current TDD configuration via the receiver, deter lining a downlink hybrid automatic request (DL-HARQ) timing reference configuration from the predetermined TDD configuration set, wherein downlink subframes of the DL-HARQ timing reference configuration are a superset of each TDD configuration of an allowable set of dynamic TDD configurations, wherein the allowable set of dynamic TDD configurations comprises one or more possible TDD configurations by which each downlink subframe of the current TDD configuration is not re-configured to a uplink subframe by the dynamic TDD configuration selected from the allowable set, and implementing a HARQ process by following a reference timing of the DL-HARQ timing reference configuration.

In order to make the aforementioned features and advantages of the present disclosure comprehensible, exemplary embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the present disclosure and is therefore not meant to be limiting or restrictive in any manner. Also the present disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

FIG. 1A is a table which illustrates a current uplink-downlink configuration in a LTE communication system.

FIG. 1B is a table which illustrates a maximum number of DL-HARQ processes ($M_{DL-HARQ}$) for TDD in a LTE communication system.

FIG. 4 is a table which illustrates the end result of using the techniques of FIGS. 3A & 3B in accordance with an exemplary embodiment of the present disclosure.

FIG. 6 is a table which illustrates a result of implementing the techniques of FIG. 5 in accordance with an exemplary embodiment of the present disclosure.

DETAILED DESCRIPTION OF DISCLOSED EMBODIMENTS

Figure 2:
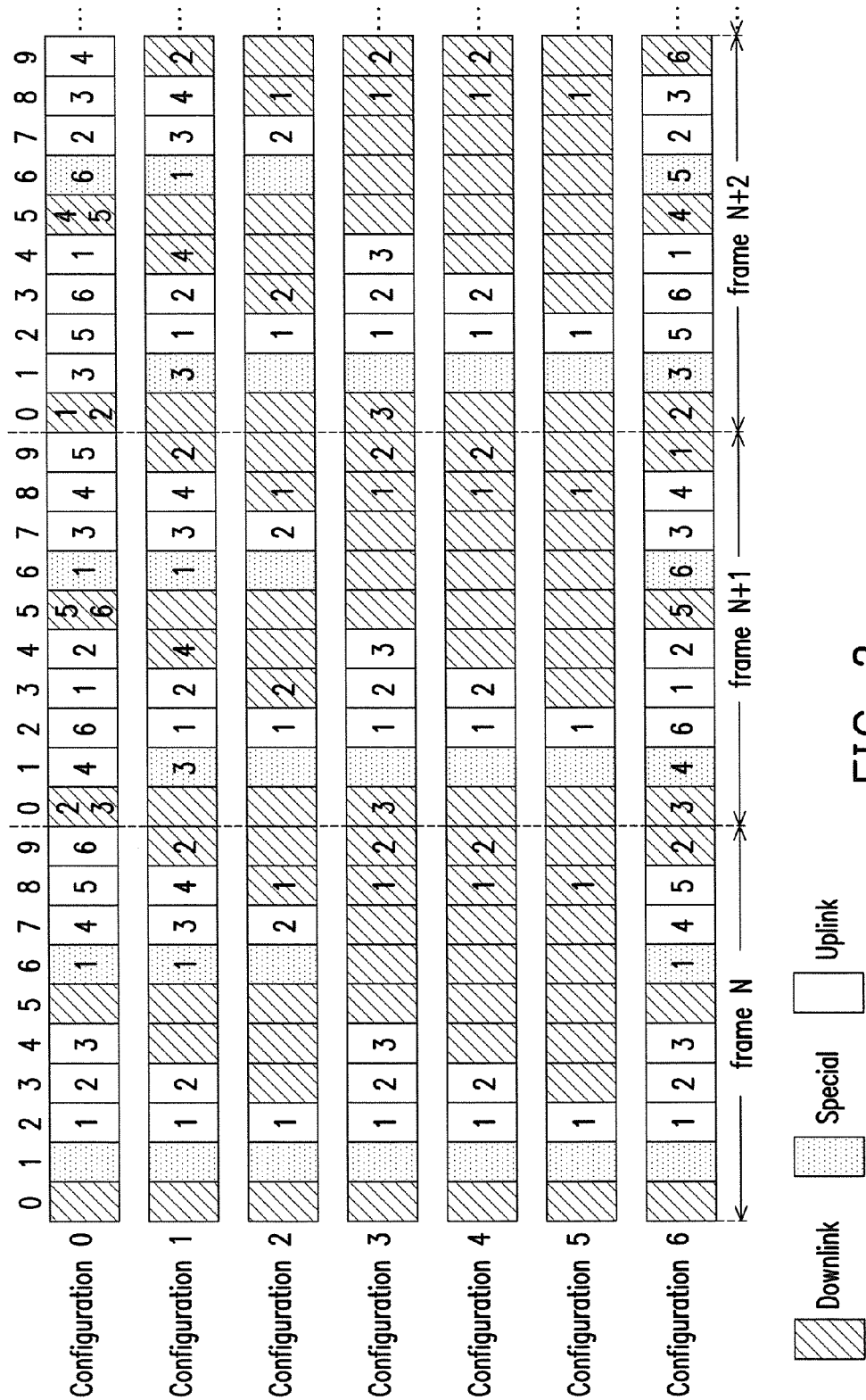
FIG. 2 is a table which illustrates UL HARQ timelines for the seven TDD configurations in a LTE communication system.

Reference will now be made in detail to the present exemplary embodiments of the disclosure, examples of which are illustrated in the accompanying drawings. Wherever possible, the same reference numbers are used in the drawings and the description to refer to the same or like parts.

Currently, TDD LTE allows for asymmetric DL-UL subframe allocations of a radio frame by providing seven different semi-statically configurations. In 3GPP release 12, a dynamic TDD configuration (eIMTA) is introduced so that a base station could dynamically configure or re-configure a TDD configuration based on traffic conditions. The present disclosure is concerned with a single carrier LTE TDD system with the functionality of dynamic TDD DL-UL reconfigurations. In such a system, using dynamic techniques to configure or re-configure a TDD configuration would cause problems between legacy UEs without a dynamic re-configuration capability and new UEs possessing a dynamic re-configuration capability as legacy UEs would have a different understanding of the current TDD DL-UL configuration from new UEs since legacy systems do not support the dynamic re-configuration functionality. Consequently, there would be a variety of problems, most notably problems related to UE measurements and HARQ operations. When the dynamic TDD configuration mechanism is being used, a legacy UE (release 11 or before) will face a variety of problems.

One of the problems could be related to legacy UEs having incorrect DL signaling quality measurement results if some DL subframes have been dynamically changed to UL subframes. The measurement results would most likely be inaccurate if certain DL subframes have been dynamically changed to UL subframes. More specifically, downlink reference signals would normally accompany a downlink, and uplink reference signals would normally accompany an uplink. Also as specified by current LTE standards, legacy UEs are required to perform signal quality measurement in all DL subframes. Therefore, when a downlink subframe has been dynamically switched to an uplink subframe, a legacy UE, which lacks the capability to dynamically re-configure TDD subframe configurations, might still be performing a downlink signal quality measurement except with reference signals which are used for uplink and are intended for new UEs having dynamic TDD re-configuration capability. By using incorrect reference signals, legacy UEs would most likely obtain incorrect signal quality measurements.

Another one of the problems would be related to the legacy UEs' UL HARQ transmissions and retransmissions which could interfere with new UEs if the subframes for which the transmission/re-transmission take place have been dynamically changes to a DL subframe. Such problems could severely affect the system performance and scheduling flexibility in TDD systems having dynamic DL-UL reconfiguration. In other words, if UL HARQ occurs in a subframe that is changed to a DL subframe, the UL HARQ will interfere with the new UE.

Another problem as previously mentioned would be related to the sudden disruption of the soft buffer setting. As previously mentioned, when a TDD UL/DL configuration is dynamically re-configured, the soft buffer setting would be changed correspondingly based on the information provided by FIG. 1B. When the soft buffer setting is suddenly being altered, a UE that supports the dynamic TDD re-configuration capability may not have time to make necessary adjustments and thus may permanently lose the data that has been stored in the soft buffer.

Another one of the problems would be related to new UE's timing mismatch on the aperiodic CSI reporting. Since the timing of the aperiodic CSI reporting is dependent on the TDD configuration, the new UE would report CSI in the subframe that is already changed to downlink.

A dynamic re-configuration here means that a re-configuration is implemented by using a fast signaling mechanism such as a physical layer signaling, a MAC layer signaling, or a RRC signaling; whereas a re-configuration for legacy UEs is resorted to using the conventional SIB transmission which conveys a new re-configuration after a modification period. This would imply that as new UEs are dynamically configured to a new TDD configuration, legacy UEs may still implement a default TDD configuration for the current SI modification period until the TDD configuration has been changed in the next SI modification period.

In view of the aforementioned problems, since it would be apparent that the TDD configuration of new UEs cannot be re-configured dynamically by fast signalings in an unrestricted manner, thus the present disclosure proposes a dynamic TDD configuration mechanism which imposes certain rules or constraints to the dynamic TDD configuration/re-configuration mechanism. Accordingly, the present disclosure would provide a UE and a base station having a dynamic TDD signaling mechanism that would set the appropriate dynamic TDD UL-DL configuration for new UEs based on the current TDD DL-UL configuration for legacy UEs, would set the associated HARQ timing for new UEs, and would set the associated soft buffer setting for new UEs. Specific concepts and embodiments of the disclosure are to be elucidated by FIG. 2~FIG. 9 and the corresponding written descriptions for these FIGs to be provided forth.

FIG. 2 is a table which illustrates UL HARQ timelines for the seven TDD configurations in a LTE communication system, and FIG. 2 would serve to elucidate inventive concepts of the disclosure. In a TDD system for LTE, HARQ would be implemented in a different manner from a FDD system where an ACK/NACK message in response to a transmission on a subframe would occur at a relatively fixed interval. However, for a TDD system, an ACK/NACK message in response to a transmission on a subframe would not occur at a fixed interval because of the variable numbers of uplink subframes and downlink subframes for different TDD configurations. In general, when a downlink subframe has been used to receive downlink data, a next uplink subframe which is at least four subframes away would be used to transmit ACK/NACK, and vice versa. The four subframes delay is due to the processing delay of the receiving end.

For example, taking configuration 4 for simplicity's sake, when a first uplink is transmitted by a UE on subframe numbers 2 in frame N, the corresponding ACK/NACK would be received by the same UE at subframe number 8 of frame N. Similarly when a second uplink is transmitted on subframe number 3 in frame N, the corresponding ACK/NACK would be received at subframe number 9 of frame N. When a ACK/NACK signaling is received by the UE at subframe number 8, the corresponding retransmission would be transmitted by the UE at subframe number 2 of frame N+1, and so forth.

In view of FIG. 2, the rational basis behind the present disclosure would be evident upon the following reasoning. From FIG. 2, it would be noted that if a DL subframe is dynamically changed to a UL subframe, legacy UEs would obtain incorrect DL channel quality measurement for the reason already described. However, if a UL subframe is dynamically changed to a DL subframe, no problem would occur. The reason is that a serving base station of a UE would have control over when the UE supposes to transmit uplink data to the serving base station. By controlling the UE to not transmit uplink data in the same time slot as new UEs which receive downlink data, no problem would occur. Also when UL HARQ of legacy UEs occurs in the subframe that is dynamically changed to a DL subframe for new UEs, the UL HARQ of legacy UEs will interfere with DL of new UEs.

In view of the rationale above, the present disclosure proposes a dynamic TDD configuration mechanism which follows at least one or more of the following three criteria as appropriate relationships between dynamic TDD DL-UL configurations for new UEs and the currently configured TDD DL-UL configuration would be required. (1) A dynamic TDD configuration for new UEs would need to be based on the current configured TDD configuration for legacy UEs. (2) The situation in which the UL HARQ of legacy UE occurs in a subframe that has been dynamically re-configured to a DL subframe for new UEs would need to be avoided so that the UL HARQ of legacy UEs would not interfere with DL of new UEs. (3) The situation in which a DL subframe is dynamically re-configured to a UL subframe would need to be avoided. By following the above mentioned criteria, when a base station dynamically configure or re-configure a subframe for new UEs which possess the dynamic TDD re-configuration capability, the base station would choose from a TDD configuration set such as the one of FIG. 1 to determine a new dynamic TDD configuration which satisfies the three criteria for new UEs. Therefore, the aforementioned criteria would be used to define an allowable set of dynamic TDD configurations as a function of the current TDD configuration as defined in the SI transmitted from a base station for legacy UEs.

Figure 3A:
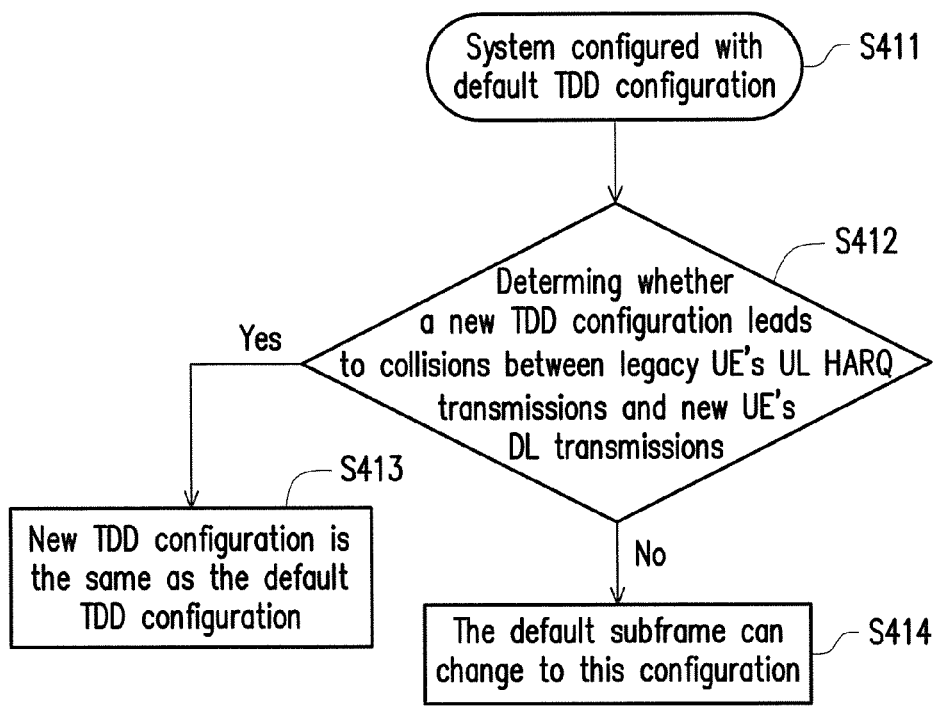
FIG. 3A is a flow chart which illustrates a technique to determine a set of allowable dynamic TDD configuration that corresponds to each current TDD configuration in accordance with an exemplary embodiment of the present disclosure.
Figure 3B:
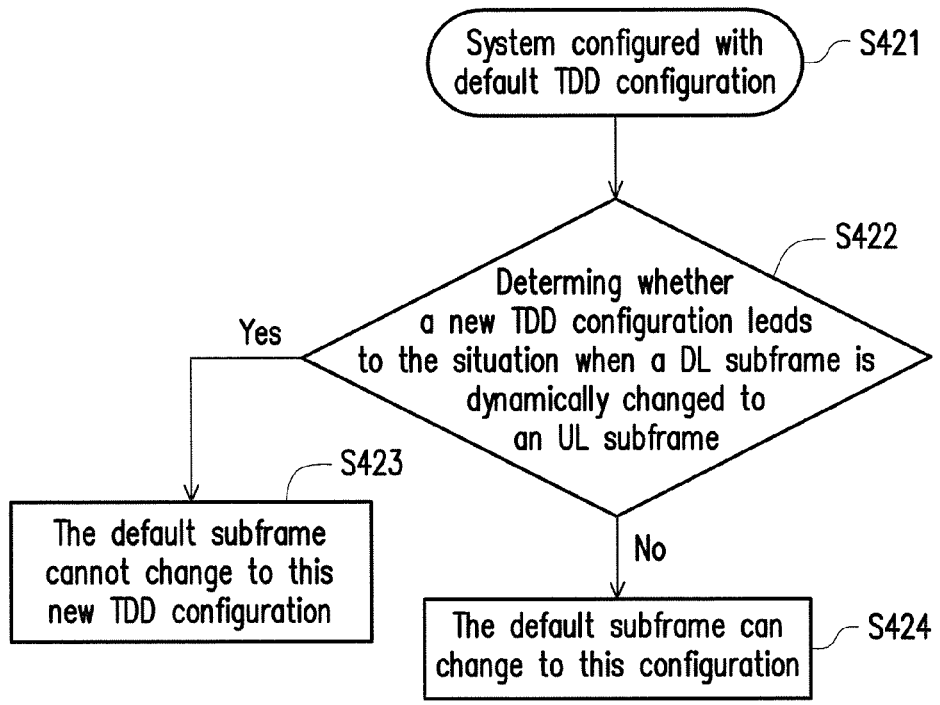
FIG. 3B is a flow chart which illustrates another technique of determining a set of allowable dynamic TDD configuration that corresponds to each current TDD configuration in accordance with an exemplary embodiment of the present disclosure.
Figure 3C:
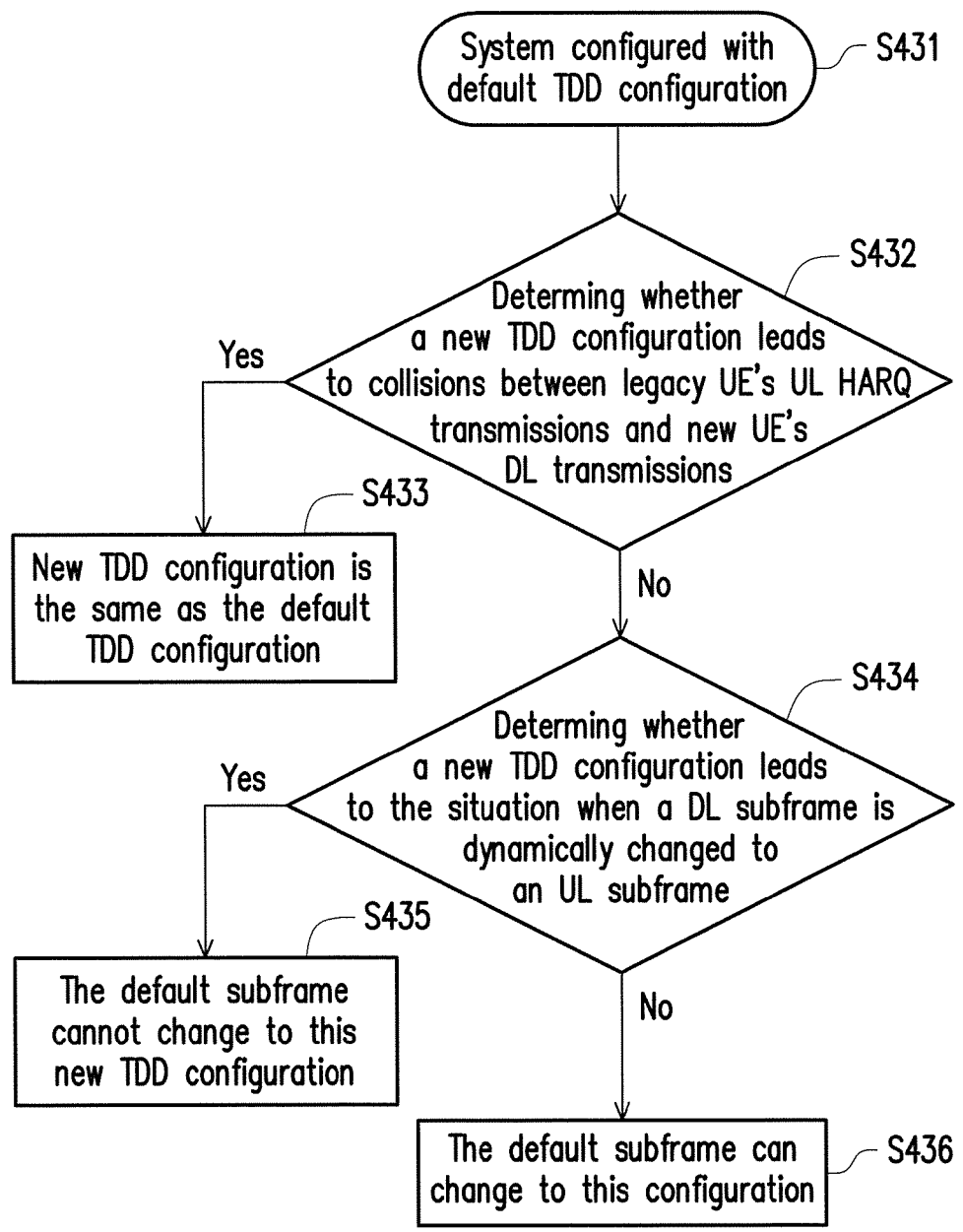
FIG. 3C is a flow chart which illustrates one possible combination using the technique of FIG. 3A and FIG. 3B.
Figure 5:
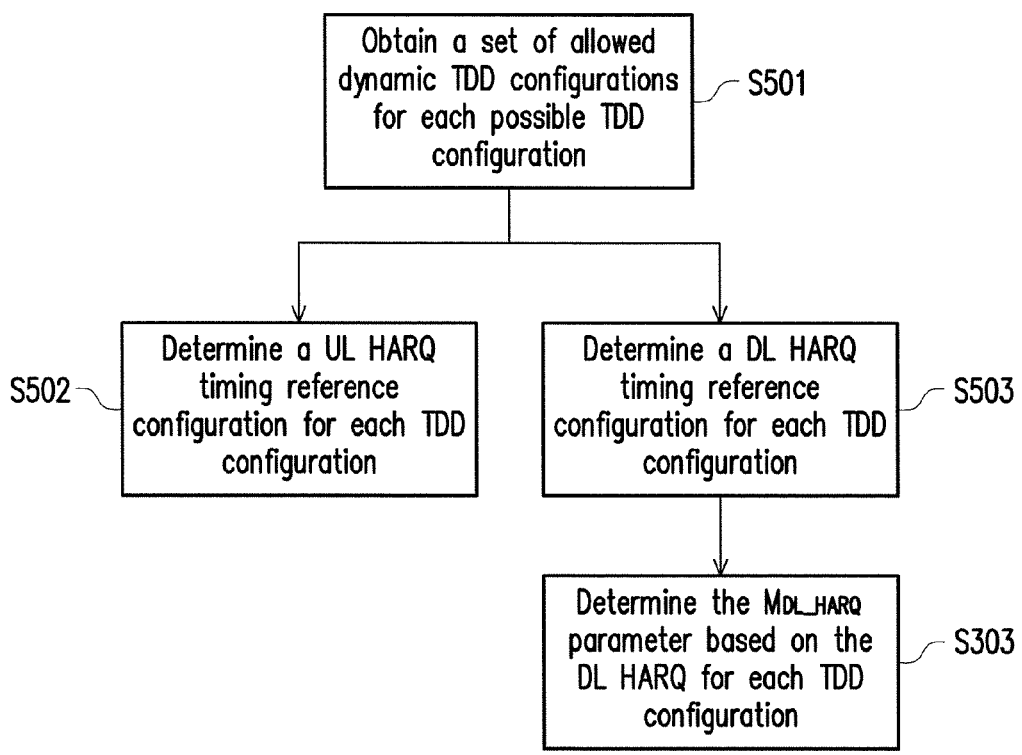
FIG. 5 illustrates a procedure of determining a UL HARQ timing reference configuration, a DL HARQ timing reference configuration, and the $M_{DL\_HARQ}$ parameter in accordance with an exemplary embodiment of the present disclosure.

FIG. 3A~3C are flow charts which illustrate various determining logic which determines whether a dynamic TDD configuration would be appropriate. FIG. 3A is a flow chart which illustrates a first determining logic, and the determining logic could be applicable for both new UEs and base stations capable of dynamic TDD configuration mechanism for different purposes. In step S411, a system is configured with a default TDD configuration. The default configuration could be a dynamic TDD configuration which was previously configured, or the default configuration could be a current TDD configuration which is used by the legacy UE. In step S412, whether a dynamic TDD configuration would lead to interferences between legacy UEs' UL HARQ transmissions and new UEs' DL transmissions would be determined. If so, in step S413, the dynamic TDD configuration would be discarded and a new dynamic TDD configuration could be determined. If no interferences could occur in step S412, then in step S414, the default subframe configuration would be changed to the dynamic TDD configuration.

FIG. 3B is a flow chart which illustrates a second determining logic, and the determining logic could be applicable for both new UEs and base stations capable of dynamic TDD configuration mechanism for different purposes. In step S421, a system is configured with a default TDD configuration. The default configuration could be a dynamic TDD configuration which was previously configured, or the default configuration could be a current TDD configuration which is used by the legacy UE. In step S422, whether the dynamic TDD configuration would lead to a situation in which a DL subframe is dynamically changed to a UL subframe would be determined. If so, then in step S423, the default subframe cannot be changed to this dynamic TDD configuration as a new dynamic TDD configure might need to be determined. In step S424, if the dynamic TDD configuration would not lead to the situation in which a DL subframe is dynamically changed to a UL subframe, then the dynamic TDD configuration instead of the default TDD configuration would be used by new UEs to transmit and receive data. Also the dynamic TDD configuration would belong to an allowable set or in other words be considered as an appropriate dynamic TDD configuration. It should be noted that the determining logic of FIG. 3A and FIG. 3B can be independently applied.

FIG. 3C is one possible combination of the determination logic of FIG. 3A and FIG. 3B. In step S431, a system is configured with a default TDD configuration. The default configuration could be a dynamic TDD configuration which was previously configured, or the default configuration could be a current TDD configuration which is used by the legacy UE. In step S432, whether a dynamic TDD configuration would lead to interferences between legacy UEs' UL HARQ transmissions and new UEs' DL transmissions would be determined. If so, in step S433, the dynamic TDD configuration would be discarded and a new dynamic TDD configuration could be determined. If no interferences could occur in step S432, then in step S434, whether the dynamic TDD configuration would lead to a situation in which a DL subframe is dynamically changed to a UL subframe would be determined. If so, then in step S435, the default subframe cannot be changed to this dynamic TDD configuration as a new dynamic TDD configure might need to be determined. In step S434, if the dynamic TDD configuration would not lead to the situation in which a DL subframe is dynamically changed to a UL subframe, then the dynamic TDD configuration instead of the default TDD configuration would be used by new UEs to transmit and receive data. Also the dynamic TDD configuration would belong to an allowable set or in other words be considered as an appropriate dynamic TDD configuration. It should be noted that it should be evident for an ordinary person skilled in the art that the steps S432 and S433 can be swapped with the steps S434 and S435 as implementing FIG. 3A first before FIG. 3B or implementing FIG. 3B first before implementing FIG. 3A would generate the same result.

By following the determining logic of FIG. 3A~3C, a set of allowed dynamic TDD configuration that corresponds to each current TDD configuration in accordance with an exemplary embodiment of the present disclosure could be derived. Based on the TDD configurations of the table of FIG. 1, a set of allowable TDD configuration could be determined for each of the seven TDD configuration of FIG. 1 by following the determining logic of FIG. 3A~3C. One of such results could be summarized as a table shown in FIG. 4 which shows the result of applying both the determining of FIG. 3A and FIG. 3B, and the table could be stored in both a base station and a new UE so that both the base station and the new UE could determine whether a dynamic TDD configuration is appropriate or allowable by using the table. It should be noted that, if a different set of TDD configuration is used instead of FIG. 1, the principle of the present disclosure could still be followed by an ordinary person skilled in the art to generate a different table by following the three aforementioned criteria implemented by the determining logic of FIG. 3A~3C.

The derivation of the table of FIG. 4 would be further elucidated in the followings. For ease of exposition, a set of the current TDD configuration signaled to legacy UEs could be denoted by $i; i \in \{0,1,2,3,4,5,6\}$ which are the complete set of current TDD configurations as shown in FIG. 1. Since dynamic TDD configuration would be based on the current TDD configuration, i, an appropriate set of dynamic TDD configuration for each of the current TDD configuration for new UEs could be denoted by $B_i$, based on i.

Following the principle of step S412, it could be noted that all UL HARQ timelines repeat themselves every radio frame which is 10 ms except for TDD configuration 0 and 6. By dynamically changing TDD configurations for i=0 or i=6 to a different TDD configuration would lead to interference between legacy UEs' UL HARQ transmissions and new UEs' DL transmissions, since it can be observed from FIG. 2 that the UL HARQ timeline does not repeat identically between each set of radio frames. Therefore $B_0=\{0\}$ and $B_6=\{6\}$. This would mean when the current TDD configuration is configuration 0 for the legacy UE, the dynamic TDD configuration cannot be changed and should stay at 0. When the current TDD configuration is configuration 6 for the legacy UE, the dynamic TDD configuration cannot be changed and should stay at 6. Therefore, by following the determining logic of FIG. 3A alone, $B_0=\{0\}$, $B_1=\{1, 2, 3, 4, 5\}$, $B_2=\{1, 2, 3, 4, 5\}$, $B_3=\{1, 2, 3, 4, 5\}$, $B_4=\{1, 2, 3, 4, 5\}$, $B_5=\{1, 2, 3, 4, 5\}$, and $B_6=\{6\}$ when i=0, 1, 2, 3, 4, 5, 6 respectively.

The principle of step S422 would be followed to avoid legacy UEs having incorrect DL measurement results so that the situation in which a DL subframe is dynamically changed to an UL subframe would be avoided. As a consequence, the set Bi is composed of the TDD configurations whose DL subframes constitute a superset of that in configuration i. Therefore, by following the principle of FIG. 3B alone, when i=0, $B_0=\{0, 1, 2, 3, 4, 5, 6\}$, when i=1, $B_1=\{1, 2, 4, 5\}$, when i=2, $B_2=\{2, 5\}$, when i=3, $B_3=\{3, 4, 5\}$, when i=4, $B_4=\{4, 5\}$, when i=5, $B_5=\{5\}$, and when i=6, $B_6=\{1, 2, 3, 4, 5, 6\}$.

If the criteria of both FIG. 3A & FIG. 3B would need to be satisfied, what is shown in FIG. 4 would be the result of the combination of the determine logic of FIG. 3A & FIG. 3B, and one such combination could be the determining logic of FIG. 3C. In order to satisfy the criteria of FIG. 3A, when i=0 or 6, $B_0=\{0\}$ or $B_6=\{6\}$ respectively. In order to satisfy the criteria of FIG. 3B, when i=1, $B_1=\{1, 2, 4, 5\}$, when i=2, $B_2=\{2, 5\}$, when i=3, $B_3=\{3, 4, 5\}$, when i=4, $B_4=\{4, 5\}$, when i=5, $B_5=\{5\}$. The above mentioned result would be summarized as FIG. 4.

The derivation of FIG. 4 when i=1, 2, 3, 4, and 5 would be further provided with these following examples. Referring to the illustration of FIG. 2, assuming the current TDD configuration is configuration 1, configuration 2 would belong to an allowable set of TDD configuration. The reason is that the DL subframes of configuration 1 are subframes 0, 4, 5, and 9, and the DL subframes of configuration 2 are subframes 0, 3, 4, 5, 8, 9. Since subframes 0, 4, 5, and 9 is a subset of subframes 0, 3, 4, 5, 8, 9, no DL subframe of configuration 1 would be dynamically change to a UL subframe after switching to configuration 2. The same holds true for configuration 4 and 5 for which no DL subframe of configuration 1 would be dynamically changed to a UL subframe after switching configuration 5. Notice that for configuration 3, the DL subframe number 4 would be switched to an UL subframe after switching from configuration 1 to configuration 3; therefore, configuration 3 does not belong to the set of dynamic TDD configurations of configuration 1. Also it was already mentioned that for the case when the current TDD configuration 1, the possibility of switching configuration 0 or 6 has been eliminated since if configuration 1 is switched to either of configurations 0 and 6, UL HARQ would occur in the subframe that is changed to a DL subframe so that the UL HARQ of a legacy UE would interfere with the HARQ of a new UE.

For another example, observe configuration 5 of FIG. 2. Since configuration 5 of all configuration of FIG. 1 has the most DL subframes, it would not be possible for configuration 5 to switch to another configuration without having at least one DL subframe switching to a UL subframe. Therefore, the allowable subset of dynamic TDD configuration for configuration 5 would only be configuration 5. Since the allowable subset other configurations could be derived by an ordinary person skilled in the art by following the above mentioned principle and examples, the derivations for other configurations will not be repeated.

Therefore, the table of FIG. 4 would be stored in the memory of new UEs and serving base stations of new UEs which possess the dynamic TDD configuration/re-configuration capability. When a base station has to dynamically adjust the TDD configuration of new UEs because of the demands of the network traffic, the base station would select the dynamic TDD configuration for new UEs from the allowable set of dynamic TDD configuration(s) corresponding to each of the current TDD configuration for legacy UEs. For example, if the current TDD configuration for legacy UEs is 3, then according to FIG. 4, the dynamic TDD configuration cannot be other than configurations 3, 4, or 5. If the current TDD configuration for legacy UEs is 0, 5, or 6, then dynamic TDD re-configuration would essentially be not allowed until the current TDD configuration has been changed to a different current TDD configuration such as configurations 1, 2, 3, and 4 via a change in the SI.

It should be noted that, in an alternative embodiment, instead of using a lookup table stored in a memory, the determination logic in the form of a digital or analogue circuit could be used to determine whether a dynamic TDD configuration belongs to an allowable set which is based on the current TDD configuration used by the legacy UE.

The above mentioned embodiments would resolve the backward compatibility problems related to UE measurements and HARQ operations between legacy UEs and new UEs. However, dynamic switching of TDD configurations would also lead to problems among new UEs for reasons related to HARQ timing mismatch and disruptions of soft buffer management for new UEs as mentioned previously. Therefore, in order to solve the problems, the UL HARQ timing reference $U_i$, the DL HARQ timing reference $D_i$, and the maximum number of DL HARQ processes per cell, $M_{DL\_HARQ}$, would be defined in relation to the set of allowable dynamic TDD configurations to be described in detail in the followings. The solutions could be represented by FIG. 5 as a series of steps.

In step S501, a set of allowed dynamic TDD configurations for each possible TDD configuration could be obtained using the techniques described by either FIG. 3A, FIG. 3B or FIG. 3C and their corresponding written descriptions, and one possible end result is illustrated by FIG. 4 which shows a set of allowable dynamic TDD configurations $B_i$ for TDD configuration i, where i is typically an integer between 0~7 for a LTE communication system; however, i could be any integer above 7 in case that the predetermined TDD configuration table of FIG. 1A for the LTE communication system is to be changed in the future. The set of allowed dynamic TDD configurations is not limited to FIG. 4 as the results generated by FIG. 3A or FIG. 3B could also be used in this step.

In step S502, a UL HARQ timing reference configuration $U_i$ for TDD configuration i would be determined. The UL HARQ timing reference configuration $U_i$ could be determined by selecting a TDD configuration from $B_i$ in which the UL subframe(s) is a superset of every TDD configuration in $B_i$. If there are multiple TDD configurations fulfilling the aforementioned criterion, then the TDD configuration having the least number of UL subframes would be chosen as the reference configuration. In general, during the time period where legacy UEs are configured for the TDD configuration i, the UL HARQ timing for new UEs would follow the timing defined for TDD configuration Ui.

For example, assuming that the set of allowable dynamic TDD configurations under the circumstance when the legacy UEs have been configured for TDD configuration 1 is 1, 2, 4, and 5 as FIG. 4 illustrates that $B_{i=1}$=1, 2, 4, 5, this would mean that new UEs would be able to switch among TDD configurations 1, 2, 4, and 5 of FIG. 1A. According to FIG. 2, UL subframes for configurations 1 are subframes 2, 3, 6, 7, and 8. UL subframes for configuration 2 are subframes 2, 6 and 7. UL subframes for configuration 4 are subframes 2, and 3. UL subframes for configuration 5 are subframes 2. It should be noted that the special subframes of FIG. 2 have been counted as downlink subframes. In this example, it could be observed that the configuration 1's uplink subframes 1, 2, 3, 6, 7, and 8 are a superset of uplink subframes of configurations 2, 4, and 5. In other words, uplink subframes of configurations 2, 4, and 5 are a subset of configuration 1. Therefore, configuration 1 would be selected as the TDD configuration for UL HARQ timing reference configuration when $U_{i=1}$. This would mean that when legacy UEs have been configured for TDD configuration 1, the reference timings of UL HARQ operations for new UEs would follow the TDD configuration 1's reference timing as shown in FIG. 2. For other TDD configurations when i≠1, please refer to FIG. 6 in which the third column from the left illustrates the end result of implementing step S502. It should be noted that in this particular example, the UL-HARQ timing reference configuration $U_i$ would follow the current TDD configuration for legacy UEs by following the principle of step S502.

In step S503, a DL HARQ timing reference configuration for each TDD configuration would be determined. The TDD configuration for DL HARQ reference, Di, is found by choosing the TDD configuration in which the DL subframe(s) is a superset of every TDD configuration in $B_i$. If there are multiple TDD configurations fulfilling the aforementioned criterion, the TDD configuration having the least number of DL subframes would be chosen as the DL HARQ reference configuration. In general, during the time period where legacy UEs are configured as TDD configuration i, the DL HARQ timing for new UEs would follow the timing defined for TDD configuration Di.

For example, assuming that the set of allowable dynamic TDD configurations under the circumstance when the legacy UEs have been configured for TDD configuration 3 is 3, 4, and 5 as FIG. 4 illustrates that $B_{i=3}$=3, 4, 5, this would mean that new UEs would be able to switch among TDD configurations 3, 4, and 5 of FIG. 1A. According to FIG. 2, DL subframes for configurations 3 are subframes 0, 1, 5, 6, 7, 8, and 9. DL subframes for configuration 4 are subframes 0, 1, 4, 5, 6, 7, 8 and 9. DL subframes for configuration 5 are subframes 0, 1, 3, 4, 5, 6, 7, 8, and 9. It should be noted that special subframes have been counted as downlink subframes. For the case of DL, it could be observed from FIG. 2 that configuration 5 has the most downlink subframes of all TDD configurations. Therefore the configuration 5's downlink subframes 0, 1, 3, 4, 5, 6, 7, 8, and 9 are a superset of downlink subframes of configurations 3 and 4. In other words, downlink subframes of configurations 3 and 4 are a subset of configuration 5. Therefore, configuration 5 would be selected as the TDD configuration for UL HARQ timing reference configuration when $U_{i=1}$. This would mean that when legacy UEs have been configured for TDD configuration 5, the reference timings of DL HARQ operations for new UEs would follow the TDD configuration 5's reference timing as shown in FIG. 2. For other TDD configurations when i≠3, please refer to FIG. 6 in which the second column from the right illustrates the end result of implementing step S503.

In step S504 the $M_{DL\_HARQ}$ parameter for new UEs would be determined for each TDD configuration i. In general, the $M_{DL\_HARQ}$ parameter for new UEs could be determined based on the $M_{DL\_HARQ}$ parameter predefined for the TDD configuration selected for the DL HARQ, Di. In other words, the soft buffer setting for new UEs would follow the setting of the DL HARQ timing reference configuration as defined in the second column from the right of FIG. 6. For example, assuming that the TDD configuration for legacy UEs has been configured as configuration 1, then according to FIG. 6, timing reference configuration selected for $D_{i=1}$ would be TDD configuration 5. Since according to FIG. 1B, the $M_{DL\_HARQ}$ parameter for TDD configuration 5 is 15, the DL HARQ soft buffer setting or $M_{DL\_HARQ}$ for new UEs would be 15. Also since $D_{i=2,3,4,5}$ are all 15, the $M_{DL\_HARQ}$ parameter for i=2, 3, 4, 5 are all 15. Furthermore, since according to FIG. 1B, the $M_{DL\_HARQ}$ parameter for TDD configuration 0 and 7 is 4 and 6 respectively, the $M_{DL\_HARQ}$ for new UEs when i=0 and 7 would be 4 and 6 respectively.

According to exemplary embodiment, the result shown in FIG. 6 could be known to new UEs and base stations such as to store FIG. 6 as a lookup table in a storage medium or to implement FIG. 6 using analog or digital circuits such that when a new UE receives a dynamic TDD configuration/reconfiguration signaling command, the UE would be able to know the corresponding $B_i$, $U_i$, $D_i$ and the $M_{DL\_HARQ}$ parameter based on the current TDD configuration i configured for legacy UEs without additional signaling overheads. The lookup table is not limited to FIG. 6. For another example, by following the principle of FIG. 3B to select $B_i$, when i=0 and $B_0=\{0, 1, 2, 3, 4, 5, 6\}$, $D_0$ would be 5 and $M_{DL\_HARQ}$ would be 15, and when i=6 and $B_6=\{1, 2, 3, 4, 5, 6\}$, $D_6$ would be 5 and $M_{DL\_HARQ}$ would be 15.

Figure 7:
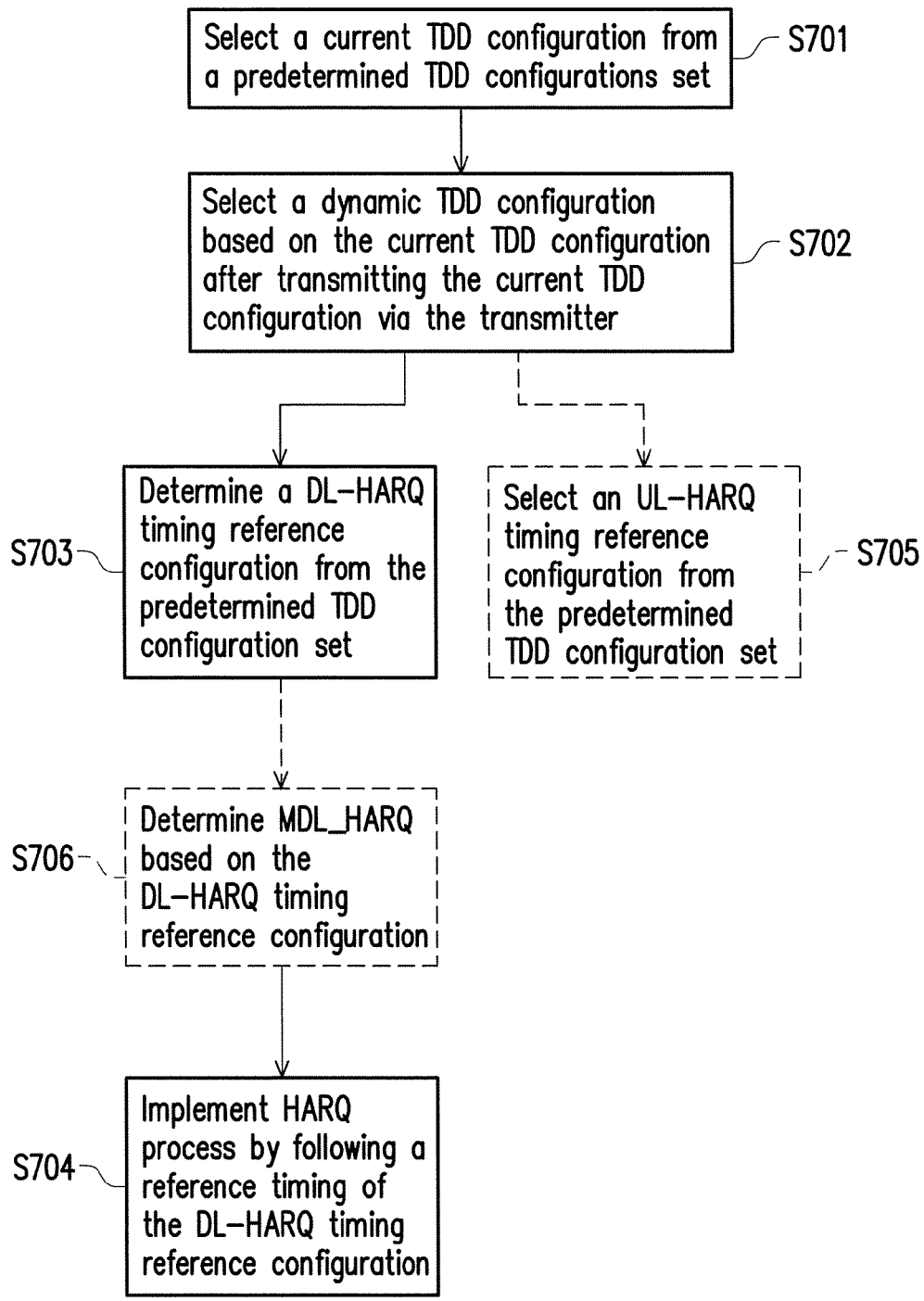
FIG. 7 illustrates a proposed dynamic TDD configuration mechanism from the perspective of a base station in accordance with an exemplary embodiment of the present disclosure.

FIG. 7 illustrates a proposed dynamic TDD configuration mechanism from the perspective of a base station in accordance with an exemplary embodiment of the present disclosure. In step S701, the base station would use a processor to select a current TDD configuration from a predetermined TDD configurations set (e.g. FIG. 1A) according to the current traffic demands. The current TDD configuration would be legacy UE compatible and could be obtained from system information blocks. In step S702, the UE would use a processor to select a dynamic TDD configuration based on the current TDD configuration after transmitting the current TDD configuration via a transmitter.

In step S703, the base station would determine a DL-HARQ timing reference configuration from the predetermined TDD configuration set. The criterion of determining the DL timing reference configuration is that downlink subframes of the DL-HARQ timing reference configuration are a superset of each TDD configuration of an allowable set of dynamic TDD configurations. The criterion of determining the allowable set of dynamic TDD configurations is to select from the predetermined TDD configuration set all possible TDD configurations by which a downlink subframe of the current TDD configuration would not be re-configured to an uplink subframe. Optionally in step S705, the UE would select an UL-HARQ timing reference configuration from the predetermined TDD configuration set. The criterion of determining the UL-HARQ timing reference configuration is that uplink subframes of the UL-HARQ timing reference configuration are a superset of each TDD configuration of the allowable set of dynamic TDD configurations.

In step S704, the base station would implement a HARQ process by following a reference timing defined by the DL-HARQ timing reference configuration. Optionally in step S706, the base station would determine the $M_{DL\_HARQ}$ by following the DL-HARQ timing reference configuration.

Figure 8:
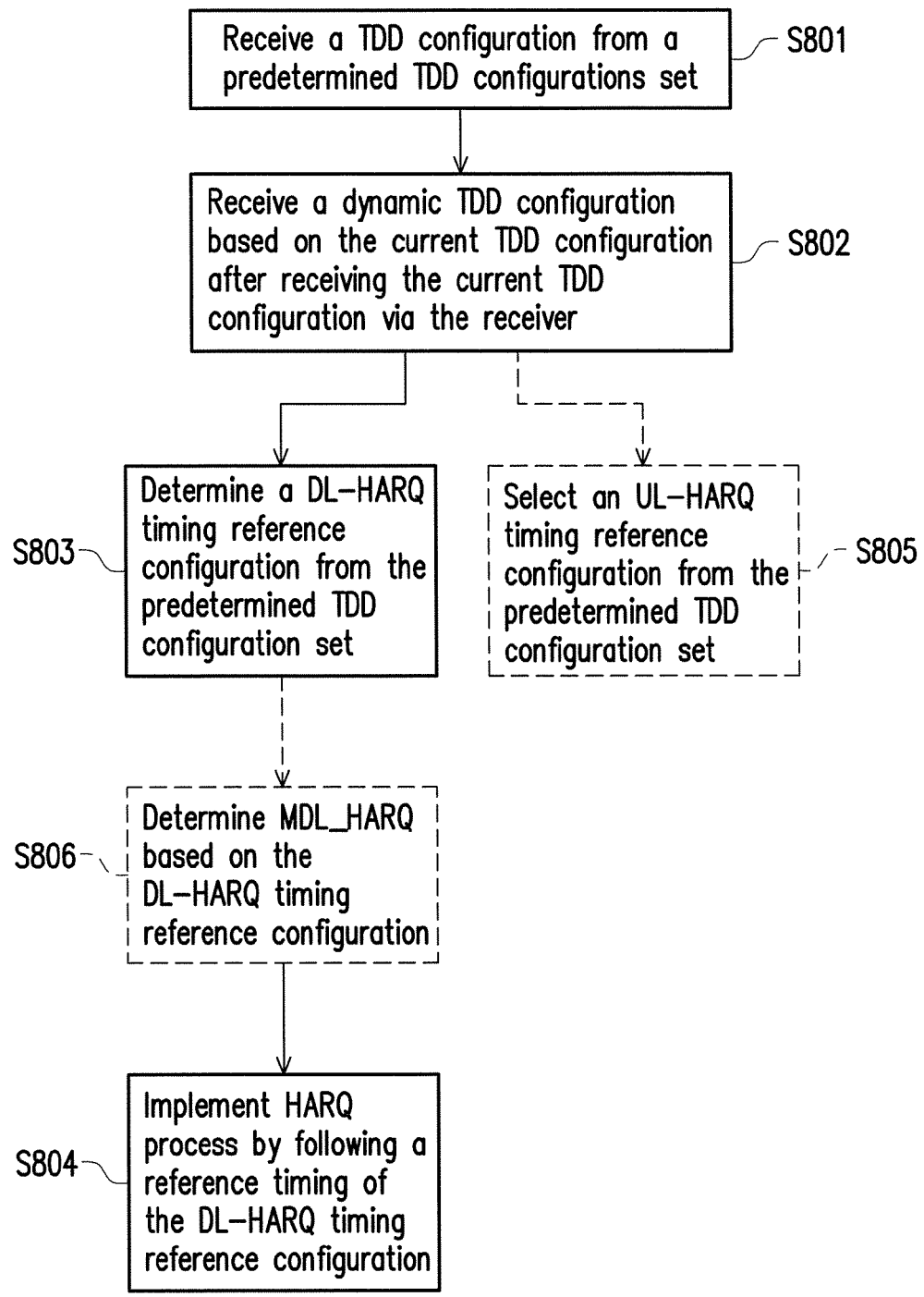
FIG. 8 illustrates a proposed dynamic TDD configuration mechanism from the perspective of a UE in accordance with an exemplary embodiment of the present disclosure.

FIG. 8 illustrates a proposed dynamic TDD configuration mechanism from the perspective of a UE in accordance with an exemplary embodiment of the present disclosure. In step S801, the UE would receive a current TDD configuration from a predetermined TDD configurations set. The current TDD configuration would be legacy UE compatible and could be obtained from system information blocks. In step S802, the UE would receive a dynamic TDD configuration based on the current TDD configuration after receiving the current TDD configuration via the receiver.

In step S803, the UE would determine a DL-HARQ timing reference configuration from the predetermined TDD configuration set. The criterion of determining the DL-HARQ timing reference configuration is that downlink subframes of the DL-HARQ timing reference configuration are a superset of each TDD configuration of an allowable set of dynamic TDD configurations. The criterion of determining the allowable set of dynamic TDD configurations is to select from the predetermined TDD configuration set all possible TDD configurations by which a downlink subframe of the current TDD configuration would not be re-configured to an uplink subframe. Optionally In step S805, Optionally in step S705, the UE would select an UL-HARQ timing reference configuration from the predetermined TDD configuration set. The criterion of determining the UL-HARQ timing reference configuration is that uplink subframes of the UL-HARQ timing reference configuration are a superset of each TDD configuration of the allowable set of dynamic TDD configurations.

In step S804, the UE would implement a HARQ process by following a reference timing defined by the DL-HARQ timing reference configuration. Optionally in step S806, the UE would determine the $M_{DL\_HARQ}$ by following the DL-HARQ timing reference configuration.

In additional, an aperiodic channel-state report timing reference configuration $C_i$ for TDD configuration i would be determined. The aperiodic channel-state report timing reference configuration $C_i$ could be determined by selecting a TDD configuration from $B_i$ in which the UL subframe(s) is a superset of every TDD configuration in $B_i$. If there are multiple TDD configurations fulfilling the aforementioned criterion, then the TDD configuration having the least number of UL subframes would be chosen as the reference configuration.

Specifically, the timing of the aperiodic channel-state report is similar to the timing in UL-HARQ procedure. Therefore, the aperiodic channel-state report timing reference configuration could be the same as UL-HARQ timing reference configuration.

In view of the aforementioned descriptions, the present disclosure is suitable for being used in a wireless communication system and is able to dynamically configure or re-configure TDD DL-UL configurations for new UEs (LTE release 12 or after) in a way that would be backward compatible with legacy UEs (before LTE release 12). Also, new UEs would be able to dynamically switch among different TDD configurations without problems related to HARQ timing mismatch and sudden interruptions of the HARQ soft buffer setting.

In this disclosure, 3GPP-like keywords or phrases are used merely as examples to present inventive concepts in accordance with the present disclosure; however, the same concept presented in the disclosure can be applied to any other systems such as IEEE 802.11, IEEE 802.16, WiMAX, and so like by persons of ordinarily skilled in the art.

A base station in this disclosure may also include base stations such as an advanced base station (ABS), a base transceiver system (BTS), a node B, an evolved node B (eNB), a home eNB, a macro base station, a pico base station, a femto base station, an access point, a home base station, a relay station, a repeater, an intermediate node, an intermediary, and/or satellite-based communication base stations.

From the hardware perspective, a base station may include at least but not limited to a transmitter circuit, a receiver circuit, an analog-to-digital (A/D) converter, a digital-to-analog (D/A) converter, a processing circuit, one or more antenna units, and optionally a storage medium. The transmitter and the receiver transmit downlink signals and receive uplink signals wirelessly. The receiver may include functional elements to perform operations such as low noise amplifying, impedance matching, frequency mixing, down frequency conversion, filtering, amplifying, and so forth. The transmitter may include function elements to perform operations such as amplifying, impedance matching, frequency mixing, up frequency conversion, filtering, power amplifying, and so forth. The analog-to-digital (A/D) or the digital-to-analog (D/A) converter is configured to convert from an analog signal format to a digital signal format during uplink signal processing and from a digital signal format to an analog signal format during downlink signal processing.

The processing circuit is configured to process digital signal and to perform mechanisms, functions, processes or procedures, or method steps of the proposed method in exemplary embodiments of the present disclosure. Also, the processing circuit may optionally be coupled to a memory circuit to store programming codes, device configurations, a codebook, buffered or permanent data, and etc. . . . . . The functions of the processing circuit may be implemented using programmable units such as a micro-processor, a micro-controller, a DSP chips, FPGA, etc. The functions of the processing circuit may also be implemented with separate electronic devices or ICs, and the processing circuit may also be implemented with either hardware or software.

The term "user equipment" (UE) in this disclosure could represent various embodiments which for example could include but not limited to a mobile station, an advanced mobile station (AMS), a server, a client, a desktop computer, a laptop computer, a network computer, a workstation, a personal digital assistant (PDA), a tablet personal computer (PC), a scanner, a telephone device, a pager, a camera, a television, a hand-held video game device, a musical device, a wireless sensor, and so like. In some applications, a UE may be a fixed computer device operating in a mobile environment, such as a bus, train, an airplane, a boat, a car, and so forth.

From the hardware perspective, a UE may include at least but not limited to a transmitter circuit, a receiver circuit, an analog-to-digital (A/D) converter, a digital-to-analog (D/A) converter, a processing circuit, one or more antenna units, and optionally a memory circuit. The memory circuit may store programming codes, device configurations, buffered or permanent data, codebooks, and etc. . . . . . The processing circuit may also be implemented with either hardware or software and would be considered to implement the mechanisms, functions, processes or procedures, and method steps of embodiments of the present disclosure. The function of each element of a UE is similar to a control node and therefore detailed descriptions for each element will not be repeated.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

Moreover, the claims should not be read as limited to the described order or elements unless stated to that effect. In addition, use of the term "means" in any claim is intended to invoke 35 U.S.C. §112, ¶6, and any claim without the word "means" is not so intended.

What is claimed is:

1. A base station comprising:
a transmitter which transmits data;
a receiver which receives data;
a processor coupled to the transmitter and the receiver and is configured for:
selecting a current time division duplex (TDD) configuration from a predetermined TDD configurations set;
selecting a dynamic TDD configuration based on the current TDD configuration after transmitting the current TDD configuration via the transmitter;
determining a downlink hybrid automatic request (DL-HARQ) timing reference configuration from the predetermined TDD configuration set, wherein
downlink subframes of the DL-HARQ timing reference configuration are a superset of each TDD configuration of an allowable set of dynamic TDD configurations, wherein
the allowable set of dynamic TDD configurations comprises one or more possible TDD configurations by which each downlink subframe of the current TDD configuration is not re-configured to a uplink subframe by the dynamic TDD configuration selected from the allowable set;
determining an uplink hybrid automatic request, UL-HARQ, timing reference configuration from the predetermined TDD configuration set, wherein
uplink subframes of the UL-HARQ timing reference configuration are a superset of each TDD configuration of the allowable set of dynamic TDD configurations; and
implementing a DL HARQ process by following a reference timing of the DL-HARQ timing reference configuration and a UL HARQ process by following a reference timing of the UL-HARQ timing reference configuration.

2. The base station of claim 1, wherein a maximum number of DL-HARQ processes ($M_{DL\_HARQ}$) is defined based on the DL-HARQ timing reference configuration.

3. The base station of claim 1, wherein if there are multiple TDD configurations fulfilling a criterion that downlink subframes of the DL-HARQ timing reference configuration are a superset of each TDD configuration of an allowable set of dynamic TDD configurations,
then the DL-HARQ timing reference configuration is determined as the TDD configuration having the least number of DL subframes.

4. The base station of claim 1, wherein if there are multiple TDD configurations fulfilling a criterion that
uplink subframes of the UL-HARQ timing reference configuration are a superset of each TDD configuration of the allowable set of dynamic TDD configurations,
then the UL-HARQ timing reference configuration is determined as the TDD configuration having the least number of UL subframes.

5. The base station of claim 1, wherein the UL-HARQ timing reference configuration is the same as the current TDD configuration.

6. A use equipment (UE) comprising:
a transmitter which transmits data;
a receiver which receives data;

a processor coupled to the transmitter and the receiver and is configured for:
   receiving a current time division duplex (TDD) configuration from a predetermined TDD configurations set;
   receiving a dynamic TDD configuration based on the current TDD configuration after receiving the current TDD configuration via the receiver;
   determining a downlink hybrid automatic request (DL-HARQ) timing reference configuration from the predetermined TDD configuration set, wherein
      downlink subframes of the DL-HARQ timing reference configuration are a superset of each TDD configuration of an allowable set of dynamic TDD configurations, wherein
         the allowable set of dynamic TDD configurations comprises one or more possible TDD configurations by which each downlink subframe of the current TDD configuration is not re-configured to a uplink subframe by the dynamic TDD configuration selected from the allowable set;
   determining an uplink hybrid automatic request, UL-HARQ, timing reference configuration from the predetermined TDD configuration set, wherein
      uplink subframes of the UL-HARQ timing reference configuration are a superset of each TDD configuration of the allowable set of dynamic TDD configurations; and
   implementing a DL HARQ process by following a reference timing of the DL-HARQ timing reference configuration and a UL HARQ process by following a reference timing of the UL-HARQ timing reference configuration.

7. The UE of claim 6, wherein a maximum number of DL-HARQ processes ($M_{DL\_HARQ}$) is defined based on the DL-HARQ timing reference configuration.

8. The UE of claim 6, wherein if there are multiple TDD configurations fulfilling a criterion that
   downlink subframes of the DL-HARQ timing reference configuration are a superset of each TDD configuration of an allowable set of dynamic TDD configurations,
   then the DL-HARQ timing reference configuration is determined as the TDD configuration having the least number of DL subframes.

9. The UE of claim 6, wherein if there are multiple TDD configurations fulfilling a criterion that
   uplink subframes of the UL-HARQ timing reference configuration are a superset of each TDD configuration of the allowable set of dynamic TDD configurations,
   then the UL-HARQ timing reference configuration is determined as the TDD configuration having the least number of UL subframes.

10. The UE of claim 6, wherein the UL-HARQ timing reference configuration is the same as the current TDD configuration.

11. A communication method using a base station, the base station comprising:
   a transmitter which is adapted to transmit data;
   a receiver which is adapted to receive data; and
   a processor coupled to the transmitter and the receiver;
   wherein the method comprises:
      the processor selecting a current time division duplex, TDD, configuration from a predetermined TDD configurations set;
      the processor selecting a dynamic TDD configuration based on the current TDD configuration after transmitting the current TDD configuration via the transmitter;
      the processor determining a downlink hybrid automatic request, DL-HARQ, timing reference configuration from the predetermined TDD configuration set, wherein
         downlink subframes of the DL-HARQ timing reference configuration are a superset of each TDD configuration of an allowable set of dynamic TDD configurations, wherein
            the allowable set of dynamic TDD configurations comprises one or more possible TDD configurations by which each downlink subframe of the current TDD configuration is not re-configured to a uplink subframe by the dynamic TDD configuration selected from the allowable set; and
      the processor determining an uplink hybrid automatic request, UL-HARQ, timing reference configuration from the predetermined TDD configuration set, wherein
         uplink subframes of the UL-HARQ timing reference configuration are a superset of each TDD configuration of the allowable set of dynamic TDD configurations; and
      the processor implementing a DL HARQ process by following a reference timing of the DL-HARQ timing reference configuration, and a UL HARQ process by following a reference timing of the UL-HARQ timing reference configuration.

12. The communication method of claim 11, wherein if there are multiple TDD configurations fulfilling a criterion that
   downlink subframes of the DL-HARQ timing reference configuration are a superset of each TDD configuration of an allowable set of dynamic TDD configurations,
   then the DL-HARQ timing reference configuration is determined as the TDD configuration having the least number of DL subframes.

13. The communication method of claim 11, wherein if there are multiple TDD configurations fulfilling a criterion that
   uplink subframes of the UL-HARQ timing reference configuration are a superset of each TDD configuration of the allowable set of dynamic TDD configurations,
   then the UL-HARQ timing reference configuration is determined as the TDD configuration having the least number of UL subframes.

14. The communication method of claim 11, wherein the UL-HARQ timing reference configuration is the same as the current TDD configuration.

15. A communication method using a user equipment, UE, the UE comprising:
   a transmitter which is adapted to transmit data;
   a receiver which is adapted to receive data; and
   a processor coupled to the transmitter and the receiver;
   wherein the method comprises:
      the processor receiving a current time division duplex, TDD, configuration from a predetermined TDD configurations set via the receiver;
      the processor receiving a dynamic TDD configuration based on the current TDD configuration after receiving the current TDD configuration via the receiver;

the processor determining a downlink hybrid automatic request, DL-HARQ, timing reference configuration from the predetermined TDD configuration set, wherein
    downlink subframes of the DL-HARQ timing reference configuration are a superset of each TDD configuration of an allowable set of dynamic TDD configurations, wherein
        the allowable set of dynamic TDD configurations comprises one or more possible TDD configurations by which each downlink subframe of the current TDD configuration is not re-configured to a uplink subframe by the dynamic TDD configuration selected from the allowable set;

the processor determining an uplink hybrid automatic request, UL-HARQ, timing reference configuration from the predetermined TDD configuration set, wherein
    uplink subframes of the UL-HARQ timing reference configuration are a superset of each TDD configuration of the allowable set of dynamic TDD configurations; and the processor implementing a DL HARQ process by following a reference ing of the DL-HARQ timing reference configuration and a UL HARQ process by following a reference timing of the UL-HARQ timing reference configuration.

16. The communication method of claim 12, wherein if there are multiple TDD configurations fulfilling a criterion that
    downlink subframes of the DL-HARQ timing reference configuration are a superset of each TDD configuration of an allowable set of dynamic TDD configurations,
    then the DL-HARQ timing reference configuration is determined as the TDD configuration having the least number of DL subframes.

17. The communication method of claim 12, wherein if there are multiple TDD configurations fulfilling a criterion that
    uplink subframes of the UL-HARQ timing reference configuration are a superset of each TDD configuration of the allowable set of dynamic TDD configurations,
    then the UL-HARQ timing reference configuration is determined as the TDD configuration having the least number of UL subframes.

18. The communication method of claim 12, wherein the UL-HARQ timing reference configuration is the same as the current TDD configuration.

* * * * *